Sept. 16, 1952            O. G. MORRAL            2,610,635

APPARATUS FOR PREPARING GREEN CORN FOR CANNING

Filed June 21, 1948            2 SHEETS—SHEET 1

INVENTOR.
OSCAR G. MORRAL
BY

ATTORNEY

INVENTOR.
OSCAR G. MORRAL

Patented Sept. 16, 1952

2,610,635

UNITED STATES PATENT OFFICE 2,610,635

APPARATUS FOR PREPARING GREEN CORN FOR CANNING

Oscar G. Morral, Morral, Ohio, assignor to Morral Brothers, Inc., Morral, Ohio, a corporation of Ohio Application June 21, 1948, Serial No. 34,203

1 Claim. (Cl. 130—9)

This invention relates to an apparatus for preparing green corn for canning and more particularly to the preparation of what is known as cream style corn.

In the preparation of cream style corn it has been customary to cut the grains of corn from the cob in two or more pieces and to scrape, or otherwise remove, from the cob the residue of the cut grains, which residue is then mixed with the cut grains. It has been found that very satisfactory cream style corn can be prepared by cutting the whole grains from the cob, grinding, or otherwise comminuting a portion of the whole grain corn and then mixing with the comminuted corn a portion of the whole grain corn, usually one-quarter to one-half whole grain corn and the remainder comminuted corn. This has heretofore required several operations on separate machines and the main object of the present invention is to provide an apparatus which in one operation will sever the grains from the cob, comminute a portion of the severed grains and mix with the comminuted corn a predetermined quantity of the whole grain corn.

A further object of the invention is to provide such an apparatus which will remove the grains of corn from the cob, separate the same into two parts, comminute one part of said grains, deliver the comminuted corn to a receptacle, and simultaneously deliver the other part of said grains to said receptacle.

A further object of the invention is to provide such an apparatus which is adjustable to regulate the proportions of the whole grain corn and comminuted corn which are delivered to said receptacle.

A further object of the invention is to provide such an apparatus which can be adjusted to deliver all or any desired part of the severed grains to the comminuting device.

Other objects of the invention will appear as the apparatus is described in detail.

Figure 1:
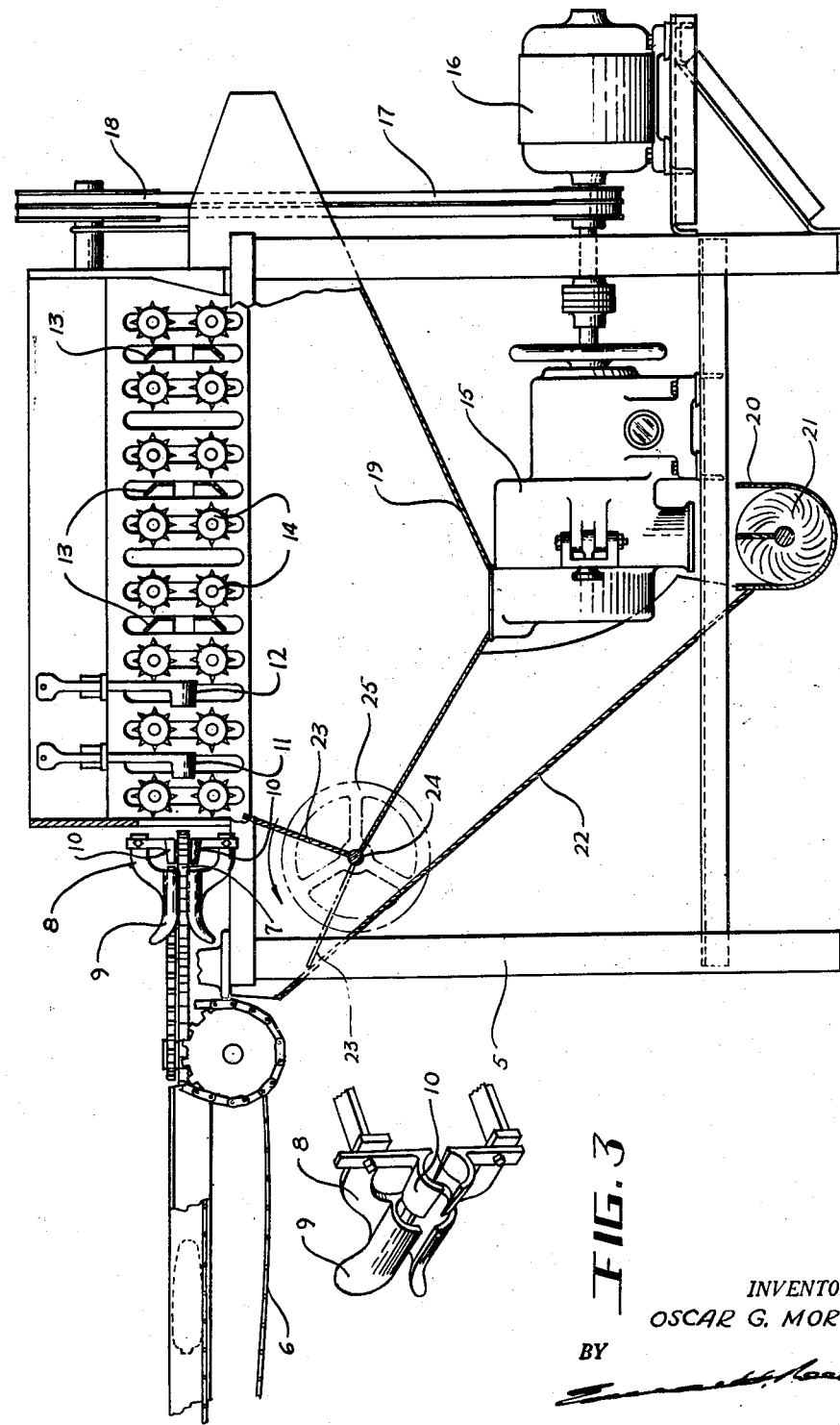
Figure 2:
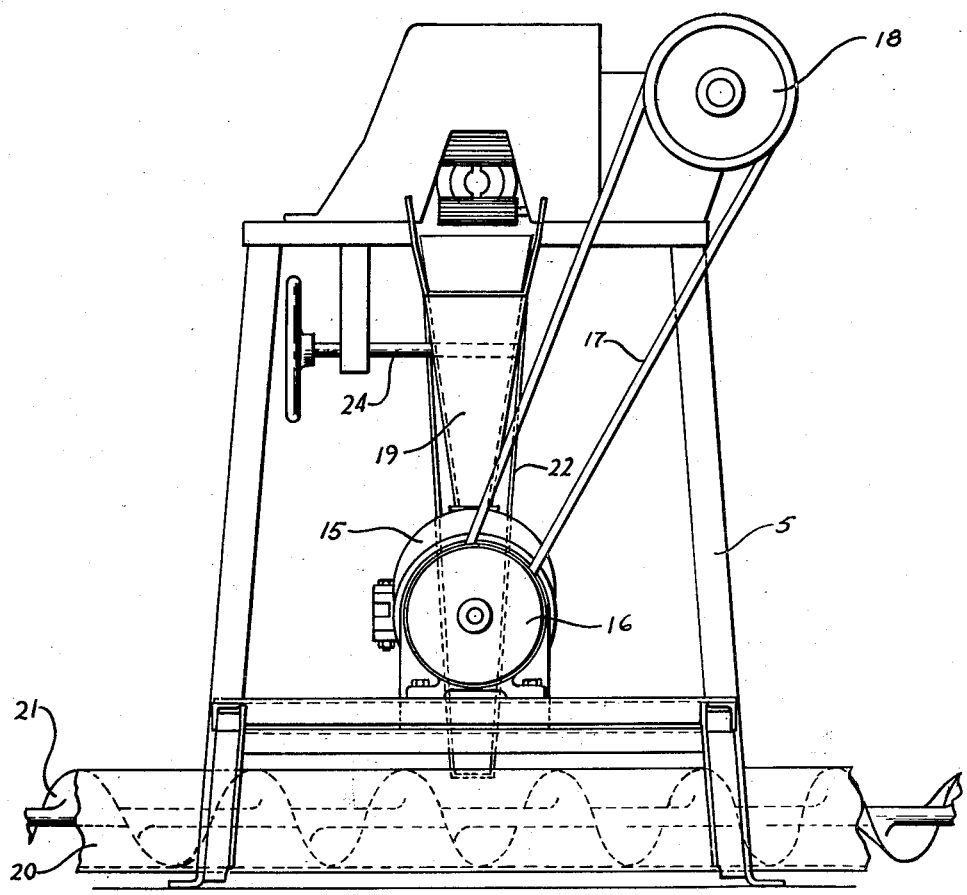

In the accompanying drawings Fig. 1 is a side elevation, partly in section, of an apparatus embodying the invention; Fig. 2 is an end elevation of such an apparatus; and Fig. 3 is a detail view of one of the cutters.

In these drawings I have illustrated one embodiment of my invention but it is to be understood that the apparatus as a whole, as well as the several parts thereof, may take various forms without departing from the spirit of the invention.

In the particular embodiment here illustrated the apparatus is mounted on a suitable supporting structure or frame 5. On the upper portion of this frame is mounted a cutting device comprising a plurality of cutters to sever the grains from different portions of the ear, and a scraper, or scrapers, to remove from the cob the residue of the grains which remains on the cob after the grains have been severed by the cutters. The cutting device here shown is of a well known type and need not be illustrated or described in detail. It comprises a conveyor 6 to receive the ears of corn and move the same in the direction of their length to a pair of spur wheels, one of which is shown at 7, and which deliver the ears to a first cutter 8. This cutter includes a fixed guide 9 and a pair of blades 10 arranged to receive an ear between them and to sever the grains of corn from portions of the ear, in the present instance from the upper and lower portions thereof. From the cutter 8 the ear passes to a second cutter 11 also comprising two blades which in the present instance are arranged to sever the grains of corn from the lateral portions or sides of the ear. It may, in some instances, be desirable to provide an additional cutter or cutters, and in the present arrangement a third cutter 12 is provided beyond the second cutter 11. Arranged beyond the third cutter, or beyond the second cutter, if only two cutters are used, is a scraper, or a plurality of scrapers, 13 which engage the cob to remove therefrom the residue of the grains, which remains on the cob after the grains have been severed. The ear may be fed from one cutter to another and to the scrapers in any suitable manner. Preferably a pair of spur wheels 14 is arranged between each pair of adjacent cutters, between the last cutter and the first scraper and between successive scrapers, the arrangement of the spur wheels being such that the ear moves continuously through the cutting device.

Mounted on the frame 5, and in the present instance directly below the cutting device, is a comminuting device 15, here shown as a grinder of a known construction, which is driven by a motor 16, also mounted on the frame, and connected by a belt 17 with a pulley 18 which drives the conveyor and ear feeding mechanism. Interposed between the cutting device and the comminuting device is a conduit, which is here shown as a hopper 19, and which extends lengthwise of the cutting device and is adapted to receive grains of corn severed by the second and third cutters, if a third cutter is employed, and the residue removed by the scrapers and to deliver this corn to the comminuting device, which comminutes the same and delivers the comminuted corn to a suitable receptacle. In the arrangement shown this receptacle comprising an elongate trough 20 extending transversely to the frame 5 below the comminuting device and having therein a spiral conveyor 21 to move the corn to a point of discharge. This conveyor may be of a length to accommodate the same to a single corn cutting device or it may be of such a length as to receive corn from several such devices.

A second conduit, here shown as a chute 22, extends from a point below the first cutter 8 to the receptacle 20. Means are provided whereby all or any desired part of the grains of corn severed by the first cutter 8 may be diverted into the chute 22 and thus delivered to the receptacle simultaneously with the delivery of comminuted corn to the receptacle. This diverting device may be of any suitable character. Preferably the front inclined wall of the hopper 19 has its upper end portion 23 formed separate from the lower stationary portion thereof and so arranged that when in an extended position substantially in line with the stationary portion, as shown in dotted lines in Fig. 1, it extends beneath the first cutter 8 and all the grains of corn severed by that cutter are directed into the hopper 19. When moved to an upright position, as shown in full lines in Fig. 1, the upper edge of the member 23 is in a plane between the first and second cutters so that all the grains of corn severed by the first cutter 8 are diverted through the chute 22 to the receptacle 20. By moving the member 23 about its pivotal axis it can be adjusted to divide the grains severed by the first cutter 8 and cause part of them to enter the chute 22 and the remainder to enter the hopper 19. In the present instance the member 23 is secured to a shaft 24 rotatably mounted in the side walls of the hopper and having in its outer end means whereby it may be moved about its axis, such as a hand wheel 25. It will be apparent when the apparatus is in operation and ears of corn are being fed in close succession to the cutting device the grains severed by the second and third cutters and the residue are delivered by the hopper to the comminuting device. All the grains severed by the first cutter 8 may be delivered to the chute or all of them may be delivered into the hopper or a part of them may be delivered into the hopper and a part delivered into the chute. Thus the comminuted corn and the whole grain corn are delivered simultaneously to the receptacle, or conveyor, where they are mixed one with the other in predetermined proportions.

While I have shown and described one embodiment of the invention I wish it to be understood that I do not desire to be limited to the details thereof as various modifications may occur to a person skilled in the art.

Having now fully described my invention what I claim as new and desire to secure by Letters Patent is:

In an apparatus of the character described, a device for severing green corn from the cob comprising means for moving an ear of corn through said device, a first cutter to sever grains of corn from a portion of said ear, a second cutter to sever grains of corn from another portion of said ear, and means to remove the residue of said grains from said cob, a comminuting device, a hopper arranged to receive grains of corn severed by said cutters, and said residue, and deliver the same to said comminuting device, a receptacle to receive comminuted corn from said comminuting device, a conduit leading to said receptacle and having its upper end below said first cutter, said hopper having an inclined wall the upper end of which is hinged to the lower portion thereof and is movable to a position to close the upper end of said conduit and direct the grains of corn severed by said first cutter to said hopper, or to an upright position to divert at least a part of the grains of corn severed by said first cutter into said conduit, and means operable from the exterior of said hopper to move said end portion of said wall to a selected position with relation to said first cutter.

OSCAR G. MORRAL.

REFERENCES CITED

The following references are of record in the file of this patent:

UNITED STATES PATENTS

| Number | Name | Date |
|--------|------|------|
| 533,723 | Morral et al. | Feb. 5, 1895 |
| 561,523 | Roberts | June 2, 1896 |
| 679,156 | Morral et al. | July 23, 1901 |
| 840,296 | Caldwell | Jan. 1, 1907 |
| 975,631 | Morral et al. | Nov. 15, 1910 |
| 1,215,563 | McIntyre | Feb. 13, 1917 |
| 1,388,211 | Starr | Aug. 23, 1921 |
| 1,467,131 | Winkel et al. | Sept. 4, 1923 |
| 2,042,946 | Holland-Letz | June 2, 1936 |
| 2,047,599 | Snyder | July 14, 1936 |
| 2,214,285 | Schmidt | Sept. 10, 1940 |
| 2,422,399 | Erickson | June 17, 1947 |